United States Patent
Foster

(10) Patent No.: US 9,798,608 B2
(45) Date of Patent: Oct. 24, 2017

(54) RECOVERY PROGRAM USING DIAGNOSTIC RESULTS

(71) Applicant: Hewlett-Packard Development Company, L.P., Houston, TX (US)

(72) Inventor: Glen A Foster, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1 day.

(21) Appl. No.: 14/764,937

(22) PCT Filed: Feb. 28, 2013

(86) PCT No.: PCT/US2013/028146
§ 371 (c)(1),
(2) Date: Jul. 30, 2015

(87) PCT Pub. No.: WO2014/133510
PCT Pub. Date: Sep. 4, 2014

(65) Prior Publication Data
US 2016/0026518 A1    Jan. 28, 2016

(51) Int. Cl.
G06F 11/00    (2006.01)
G06F 11/07    (2006.01)
G06F 11/36    (2006.01)
G06F 11/22    (2006.01)

(52) U.S. Cl.
CPC ........ *G06F 11/079* (2013.01); *G06F 11/0748* (2013.01); *G06F 11/0751* (2013.01); *G06F 11/0787* (2013.01); *G06F 11/0793* (2013.01); *G06F 11/2294* (2013.01); *G06F 11/366* (2013.01); *G06F 11/3672* (2013.01)

(58) Field of Classification Search
CPC .. G06F 11/079; G06F 11/366; G06F 11/3672; G06F 11/3692
See application file for complete search history.

(56) References Cited

U.S. PATENT DOCUMENTS

| | | | |
|---|---|---|---|
| 6,487,677 B1 * | 11/2002 | Jantz | G06F 11/0748 714/2 |
| 7,231,549 B1 | 6/2007 | Rhea et al. | |
| 7,849,454 B2 | 12/2010 | Lambert et al. | |
| 8,140,837 B2 | 3/2012 | Campbell et al. | |
| 8,214,467 B2 | 7/2012 | Dake et al. | |
| 8,694,822 B2 * | 4/2014 | Radhakrishnan | G06F 11/0709 714/4.1 |

(Continued)

OTHER PUBLICATIONS

IBM; Service Processor Communication (SP COMM) Errors Displayed for a Blade Server; http://publib.boulder.ibm.com/infocenter/bladectr/documentation/index.jsp?topic=/com.ibm.bladecenter.888.doc/dw1fs_r_blade_sp_comm_errors_on-install.html>, Retrieved from Internet Jan. 4, 2013.

(Continued)

*Primary Examiner* — Charles Ehne
(74) *Attorney, Agent, or Firm* — Hewlett Packard Enterprise Patent Department

(57) ABSTRACT

Techniques for recovering an enclosure are provided. A recovery program is retrieved from a recovery program repository. Results from a plurality of diagnostic tests are retrieved. The diagnostic test results are analyzed with the recovery program. The recovery program determines an enclosure recovery action. The enclosure is recovered using the determined recovery action.

13 Claims, 6 Drawing Sheets

(56) References Cited

U.S. PATENT DOCUMENTS

| | | |
|---|---|---|
| 9,424,152 B1 * | 8/2016 | Raut ................ G06F 11/2069 |
| 2003/0070114 A1 | 4/2003 | Yasuda |
| 2004/0044500 A1 | 3/2004 | Lu |
| 2006/0059390 A1 | 3/2006 | Duron et al. |
| 2007/0036055 A1 | 2/2007 | Ito |
| 2007/0088970 A1 | 4/2007 | Buxton et al. |
| 2007/0294575 A1 | 12/2007 | Aichelen et al. |
| 2010/0070478 A1 | 3/2010 | Anglin |

OTHER PUBLICATIONS

PCT/ISA/KR, International Search Report, mailed Nov. 27, 2013, PCT/US2013/028146, 11 pps.

* cited by examiner

RECOVERY PROGRAM USING DIAGNOSTIC RESULTS

BACKGROUND

Modern computing systems have evolved from simple stand alone boxes in a rack to a more integrated form. For example, a typical blade system includes a plurality of components housed in an enclosure. Blades contain the traditional, non shared components of the computer, such as one or more processors. Blades may also include memory, storage, and other components. An enclosure may host multiple blades. Components that may be shared between blades are moved from individual blades to the enclosure.

Some components may be housed in the enclosure and are shared by all the blades. For example, there may be power supply units in the enclosure, all of which collectively provide power to the blades. Other support components may include fans for cooling the components in the enclosure. In addition, the enclosure may include components that allow the blades to communicate with each other. For example, there may be an internal network in the enclosure that allows the blades to communicate with each other using networking protocols. There may also be other interconnects, such as a connection fabric that allows processors on individual blades to communicate with each other.

Finally, there may be interfaces on the enclosure that allow for external systems to communicate with the enclosure. Typically, these external interface are used for configuration and maintenance of the enclosure and the blades housed therein. For example, the various connection fabrics may be configured to determine which blades are allowed to communicate with each other, how power is supplied to the blades, addresses, such as IP addresses of the blades, and a whole host of other parameters.

DETAILED DESCRIPTION

Figure 1:
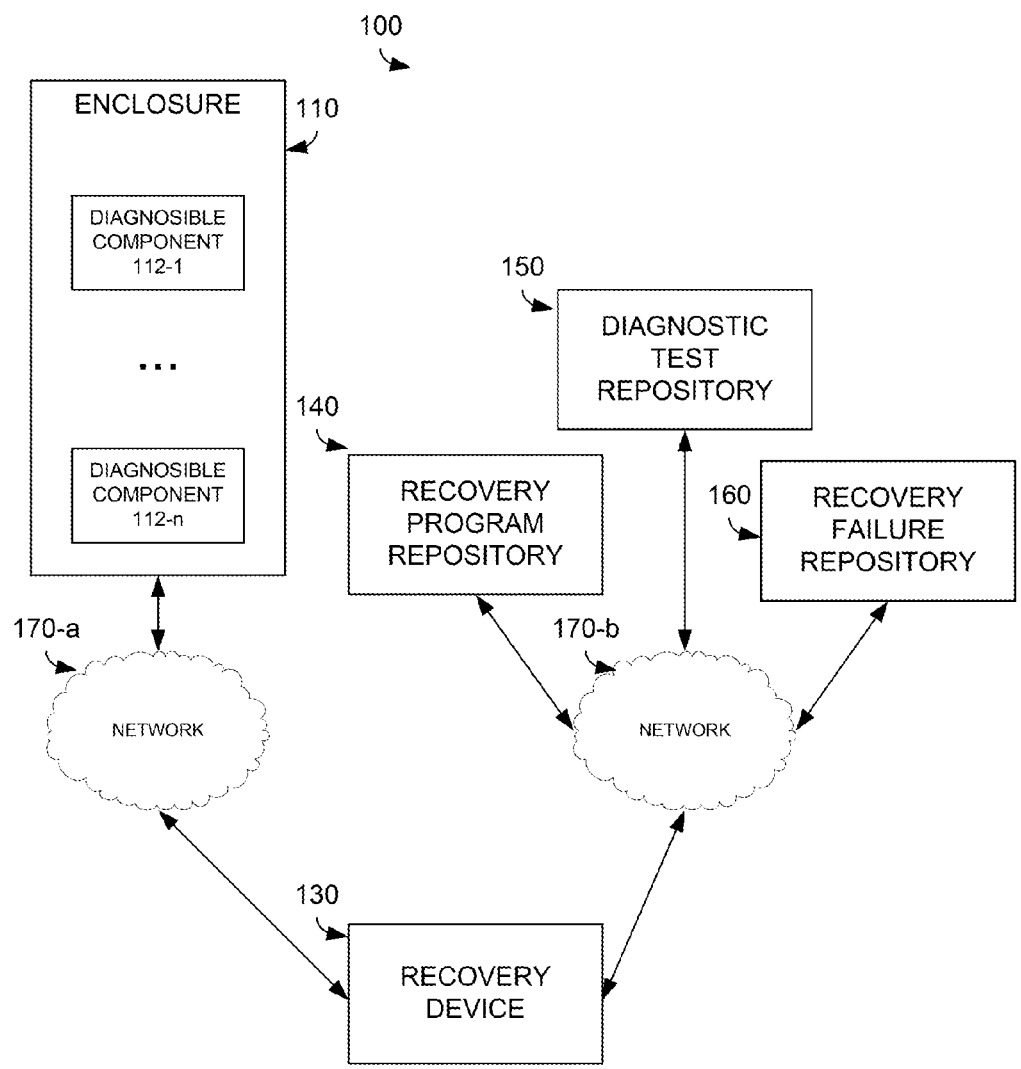
FIG. 1 is an example of a system using the recovery techniques described herein.

As computing systems get more and more complex, with additional components and interconnections between those components, the opportunity for errors introduced by improper configuration or incompatible software/firmware versions increases. For example, each of the components within an enclosure, such as the power supplies, the fans, the interconnect fabrics, the interfaces to external systems, etc. may use firmware, which is a form of software, to enable the functionality of the component. In addition to the problem of errors in the firmware for a component itself, additional errors may be introduced by firmware incompatibilities. For example, two components that need to communicate with each other may not be able to do so if they have incompatible firmware versions. As the number of components increases, the potential for incompatibilities in the firmware increases as well.

In addition, there may be configuration problems that may cause errors. For example, an enclosure may be configured to operate with redundant power supplies, although only a single power supply is physically present. This improper configuration may prevent the enclosure from properly powering up. Likewise, each blade may be configured with an Internet Protocol (IP) address to communicate on an enclosure internal IP network. If the IP addresses are improperly configured, the blades may not be able to communicate with each other. There are many other types of configuration issues that may cause operational problems within the enclosure.

In order to help diagnose some of the improper configuration issues, providers of components often provide diagnostic programs to ensure that the component is configured correctly. For example, a diagnostic program for an enclosure internal IP network may attempt to ping each blade using an expected IP address. If no response is received from a particular blade, this may be logged as a failing result for the diagnostic for that blade. Diagnostics are typically designed to test a single component or a small subset of components, in detail. The results of each of the diagnostics are typically stored and may be retrieved for analysis.

Several problems result from the use of results of diagnostic tests. As mentioned above, diagnostic test typically test a small number of components, in detail. As the diagnostic tests are refined, it may be difficult to ensure that the latest version of the diagnostic test has been run. Furthermore, the diagnostic tests may not be good at identifying problems that are outside of the scope of the diagnostic test. For example, the enclosure may be configured to operate with redundant power supplies, and will not allow the blades to power up if non-redundant power supplies are physically installed. A power supply diagnostic test may identify this condition. An enclosure internal network diagnostic may ping each blade to determine if a response is received to ensure proper configuration of the IP addresses on the blades. However, if blades are not powered up due to the power supply issue, the internal network diagnostic will fail, because a blade with no power cannot respond to the ping.

Proper analysis of the results of the diagnostic tests may involve looking at all of the results from individual tests together to determine the problem. For example, to resolve the issue of a blade that does not respond to a ping may first need to examine the results of the power supply configuration to ensure the blade is receiving power, then move to possible incorrect blade IP address configuration issues. Given the high level of interaction between the components, an experienced human engineer may need to analyze the results of the diagnostics, and through knowledge and experience, determine the most likely cause of the error. Using a human engineer can significantly increase maintenance costs, as experienced engineers tend to be very expensive to employ.

Attempts at automating the process also face significant hurdles. Although a recovery program may be developed to automate the process of recovering the enclosure, such a recovery program still has shortcomings. First, a recovery program may be static, such that newly discovered errors conditions cannot be handled by the recovery program. In addition, as mentioned above, diagnostic programs are constantly modified, and new ones may be added. A static recovery program would not be able to take into account new diagnostics or revisions to currently existing diagnostics. In addition, the results of the recovery efforts are not communicated back to the recovery program developer.

The techniques described herein overcome these problems. A recovery device, such as a laptop or desktop computer, may be connected to the enclosure. A small program on the recovery device may communicate with a recovery program repository to retrieve a recovery program. The recovery program repository may store the latest version of a recovery program. The latest version of the recovery program means the one that has most recently been made available. Because the recovery program is retrieved, there is no concern that an old recovery program may be used. Furthermore, the latest version of the recovery program may contain the most current methods for recovering the enclosure.

For example, the recovery program may know which diagnostic tests are needed and the most current versions of each of those diagnostic tests. When the diagnostic results are retrieved from the enclosure, the results can be compared to determine if all the needed results are available and if the most current version of the diagnostic tests have been run. If the results are not available or the most current version of the diagnostic test was not run, the recovery program may retrieve the latest version of the diagnostic tests from a diagnostic test repository and run the tests on the enclosure. Thus, it can be ensured that all the needed diagnostic test results are available and that the results are from the most current version.

The recovery program may then consolidate the results of all the diagnostic tests to determine the most appropriate type of recovery. For example, recovery can include changing configurations, rebooting the enclosure, etc. After the recovery action is completed, the recovery program may again test the enclosure to determine proper operation. If the recovery action was not successful, the recovery program may be run again to determine if a new type of recovery action should be performed. If the recovery program determines that recovery is not possible, the results of the recovery attempt may be stored in a recovery failure repository. The results may include the results of the diagnostic tests. From this information, a developer of the recovery program may be able to identify a newly discovered error condition that cannot be recovered by the recovery program. The developer may then modify the recovery program and place the new version in the recovery program repository. As new error conditions are identified, the recovery program is modified to handle those new error conditions. Because the recovery program is retrieved from the recovery program repository, it can be ensured that the latest version of the recovery program is used.

FIG. 1 is an example of a system using the recovery techniques described herein. The system 100 may include an enclosure 110, a recovery device 130, a recovery program repository 140, a diagnostic test repository 150, a recovery failure repository 160, and networks 170-a,b. The enclosure may be a computing system, such as a blade enclosure. Included in the enclosure may be one or more diagnosable components 112-1 . . . n.

For purposes of this description, a diagnosable component may be an element or a set of elements for which a diagnostic test is available. A diagnostic test typically will test the functionality of a subset of the elements in an enclosure. For example, a diagnosable component may be a power supply and the configuration of the power supply. A diagnostic test of the power supply component may be limited to verifying that the configuration of the power supply matches that which is actually installed in the enclosure. Other functionality provided by the enclosure is not tested by the power supply diagnostic test. Other diagnosable components may span multiple elements. Diagnosable components will be further described with respect to FIG. 2.

The system may also include a recovery device 130. The recovery device may be any type of device that is capable of connecting to the enclosure. For example, the recovery device may be a laptop computer. The recovery device may also be a desktop computer, tablet, smartphone, or any other type of computing device that is able to connect to the enclosure. The particular form of the recovery device is unimportant, as long as the functionality described below is available.

The system may also include a recovery program repository 140. The recovery program repository may store the latest version of a recovery program. In some implementations, the recovery program repository may store older versions of recovery programs. The diagnostic test repository 150 may store the latest version of the diagnostic test for each diagnosable component in the enclosure. Although the diagnostic tests may be included in the recovery device or the enclosure itself, there is no guarantee that the latest version of the diagnostic test is available on the recovery device or enclosure. Furthermore, if new diagnostics are created, those new diagnostics may not be available on the recovery device or the enclosure.

The system may also include a recovery failure repository 160. The recovery failure repository may be used to store the results of recovery actions taken on the enclosure. If the recovery action fails, such information may be stored in the recovery action failure repository. A recovery program developer may utilize this information to develop new recovery actions. These new recovery actions may be implemented in a later version of the recovery program.

The system may also include networks 170-a,b which allow the enclosure, recovery device, and repositories to communicate with each other. Although communications between the devices may typically be done over a network, techniques described herein do not require a network. For example, a recovery device, such as a laptop computer, may be directly connected to the enclosure. In addition, although shown as two separate networks 170-a,b, these two network may actually be the same physical network. Similarly, although the repositories are shown as separate elements, in some implementations the functionality of all the repositories may be combined into a single element.

In operation, an enclosure 110 may be experiencing some type of error condition. The condition may be major in that the computing systems located within the enclosure are completely unavailable. The condition may be more minor in nature in that some functionality may still be available, but not complete functionality. Regardless of the type of error condition, for full operation of the enclosure, these conditions would preferably be resolved. Returning the enclosure to a state of full operational capabilities may be referred to as recovering the enclosure.

A recovery device 130 may be coupled to the enclosure. The recovery device may be coupled to the enclosure through a network 170-a or may be directly connected to the enclosure. The recovery device may include a small program whose function is to retrieve a recovery program from a recovery program repository over a network 170-b. As explained above, the recovery program repository may contain the latest version of the recovery program. Because the recovery program is retrieved form a repository, the latest version of the recovery program may always be retrieved. The recovery program may then be executed on the recovery device.

The recovery program may specify a set of diagnostic test results that are needed in order to determine how to recover the enclosure. The recovery program may also specify the particular versions of those diagnostic tests that should be run. The recovery program may communicate with the enclosure 110 to retrieve diagnostic test results that were created by running the correct version of the diagnostic tests. The recovery program may also determine if certain diagnostic test results are not available. The results may not be available because the diagnostic test does not exist on the recovery device or enclosure, the wrong version exists, or the test has simply not been run.

The recovery device may communicate with the diagnostic test repository 150 over the network 170-b to retrieve any diagnostic tests that either do not exist on the recovery device or enclosure, or that may exist, but have an incorrect version. The recovery device may then cause the retrieved diagnostic tests to be run on the enclosure. In addition, diagnostic test for which the correct versions is already available, but for which no results exist, can also be run.

The recovery program may then retrieve the results of all the diagnostic tests specified in the recovery program. The results may be aggregated and analyzed to determine the proper action to recover the enclosure. For example, recovery actions may include rebooting the enclosure, rebooting portions of the enclosure, or changing configuration parameters of the enclosure. In other words, the recovery program looks at the pattern of errors in the diagnostic results, and based on those errors, a specified recovery action is taken. The exact form of the recovery action is unimportant, however it should be understood that the recovery program specifies what action to take.

After the recovery action is complete, the diagnostics may be run again and reanalyzed to determine if the error condition has been properly recovered. If not, the process may be repeated. For example, a recovery action may have fixed some of the error conditions, but not all of them. Rerunning the process may indicate a different type of recovery to correct the remaining error conditions.

In addition, if the enclosure has not recovered, the results may be sent to the recovery failure repository 160 over network 170-b. The results may include the results of the diagnostic tests both before and after the initial recovery was performed. A developer of the recovery program may then modify the recovery program to accommodate the specific condition that was not properly recovered. The modified version of the recovery program may be stored in the recovery program repository. Thus, the developer of the recovery program is provided with real world feedback on error conditions that cannot be recovered by the current version of the recovery program. The recovery program may be modified to accommodate the previously failing recovery action.

Figure 2:
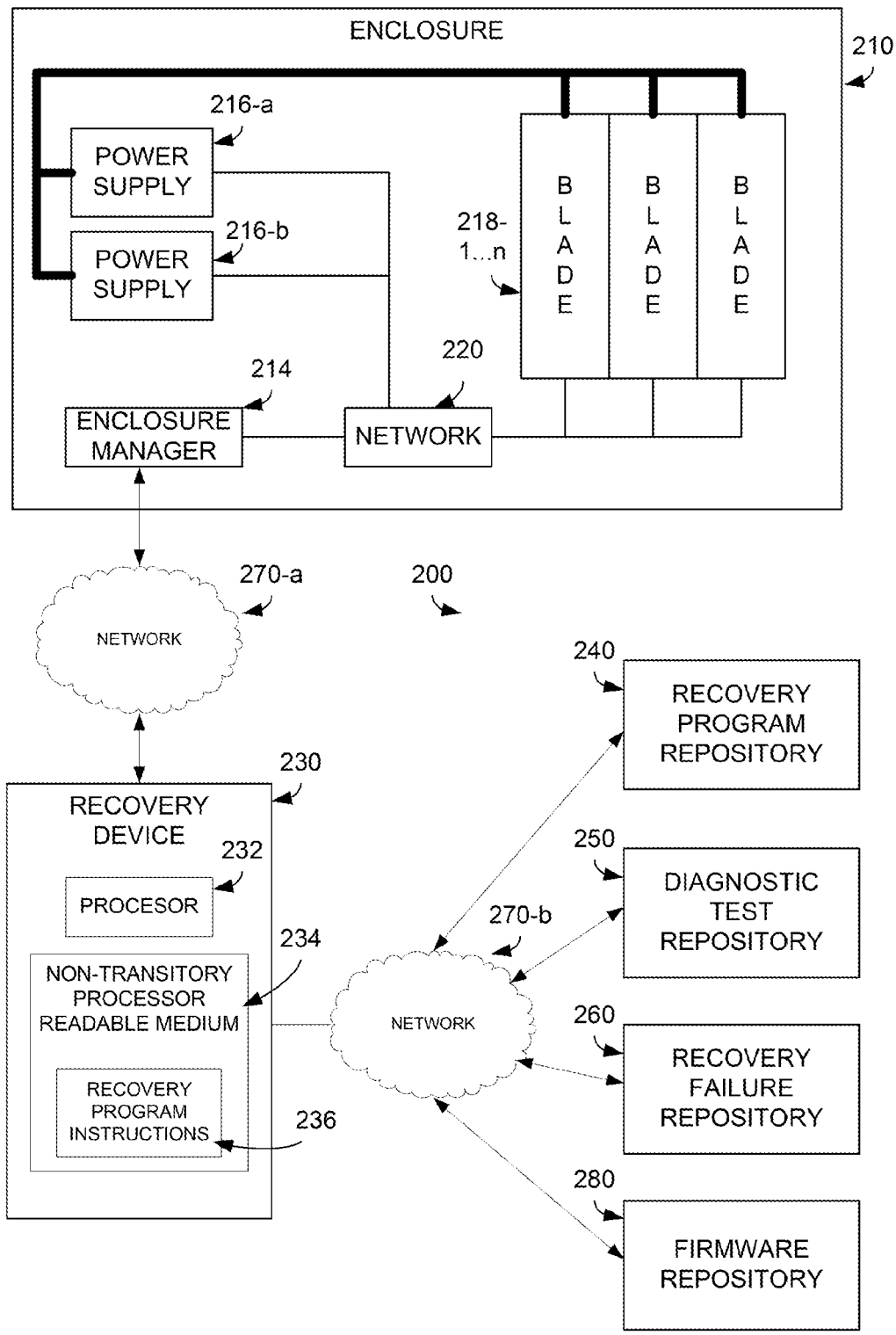
FIG. 2 is another example of a system using the recovery techniques described herein.

FIG. 2 is another example of a system using the recovery techniques described herein. FIG. 2 is generally similar to FIG. 1, with some additional details and some examples of diagnosable components. The system 200 may include an enclosure 210, a recovery device 230, a recovery program repository 240, a diagnostic test repository 250, a recovery failure repository 260, and a firmware repository 270. Networks 270-a,b may be used to enable communications between the components. The various repositories may be implemented as a computing systems which have storage for storing the programs, tests, results, and firmware. The repositories may be created using a database. Although shown as separate elements, it should be understood that the contents of the various repositories may be stored within a single system or in a single database.

The enclosure 210 may include various diagnosable components. For purposes of simplicity of explanation, several examples of diagnosable components are shown. However, it should be understood that these are examples only. More or fewer diagnosable components may exist. The techniques described herein are not dependent on any particular set of diagnosable components. The enclosure may include an enclosure manager 214. The enclosure manager may provide for communications to external systems, such as the recovery device 230. The enclosure manager may also store various configuration parameters of the enclosure.

The enclosure may also include redundant power supplies 216-a,b. These power supplies may provide power to the elements contained within the enclosure. The enclosure may also include a plurality of blades 218-1 . . . n. These blades may include processors, memory, storage, etc (not shown). Connecting all of the elements in the enclosure may be a network 220. The network may be an IP network that allows all of the elements to communicate. All of the elements may have an IP address which is used to address the element on the network 220.

The various elements contained in the enclosure may be combined to form diagnosable components. As explained above, a diagnosable component is a set of elements for which a diagnostic test is available. For example, one diagnosable component may be the power supplies. A configuration parameter in the enclosure manager may specify if redundant power supplies have been equipped. A power supply diagnostic may determine if the configuration matches the actual physical presence of redundant power supplies. It should be noted that the power supply diagnostic tests for problems within the diagnosable component, without regard to other failures that may exist. This cascading of failures will be described in further detail below.

Another example of a diagnosable component may be the network 220. A diagnostic test for that component may be to determine if each element within the enclosure is reachable over the network. If not, this may indicate a problem with the configuration of the IP addresses on the network, or a larger problem. Another example of a diagnosable component is the firmware that is installed on all of the elements within the enclosure. The diagnostic test can determine if the proper version of firmware is installed on each component. It may also determine if a later version of the firmware is available.

The recovery device 230 may include a processor 232 and a non-transitory processor readable medium 234. Contained on the non-transitory processor readable medium may be a set of recovery program instructions 236, which when executed by the processor cause the processor to implement the techniques described herein. The recovery program instructions may be retrieved from the recovery program repository 240, which is as described above. The system may also include a diagnostic test repository 250 and a recovery failure repository, which are substantially as described above. In addition, the system may include a firmware repository 280, whose operation will be described in further detail below.

In operation, an enclosure 210 may be experiencing an error condition. A recovery device may be used to attempt to recover the enclosure. It should be noted that the determination of the need to recover the enclosure may be determined by a user or may occur in an automated fashion, wherein the recovery device periodically analyzes the enclosure to determine if any recovery is needed. Initially, the recovery device may communicate with a recovery program repository to retrieve the latest version of a recovery program. By retrieving the latest version of the recovery program, it can be ensured that the recovery is being performed with the most recent version of the recovery program, which in turn ensures that all currently known recovery scenarios are included.

After retrieving the recovery program, the recovery device may run the recovery program. The recovery program may specify a set of diagnostic test results that are needed to properly determine how to recover the enclosure. The recovery program may also specify the version of the diagnostic test that should be used to produce the results. The recovery program may then query the enclosure to retrieve the results of diagnostic tests that match those specified by the recovery program. By retrieving previously existing diagnostic test results, the recovery program can avoid reexecuting tests for which results are already available.

In some cases, the results may not be available. For example, the specified diagnostic may not currently exist on the recovery device or the enclosure, or it may exist, but has not been run, or an incorrect version may exist. The recovery device may communicate with a diagnostic test repository 250 to retrieve the correct version of the diagnostic tests. Those tests that do not have results, or whose results are from an incorrect version of the diagnostic test, may be rerun.

For purposes of description, several example diagnostic tests will be described. However, this list is not intended to be exhaustive or to reflect any actual diagnostic test. The examples are simply provided for further understanding of the techniques presented herein. One example diagnostic may be a network diagnostic. This diagnostic may attempt to ping every element within the enclosure that is connected to network 220. If all components do not respond, this may be considered a diagnostic failure, and the failure may be reflected in the results. Another example of a diagnostic test may be a test of the power supplies to verify that the power supplies installed are as configured. If this is not the case, the power supplies may not become active and provide power to the blades. Yet another example of a diagnostic is a check of the firmware versions installed on each element in the enclosure. Firmware is typically provided as a package which contains compatible firmware versions for every element within the enclosure. If the versions on the various elements are mismatched, this may be considered a failure of the diagnostic.

Once all of the diagnostics needed by the recovery program have results available, the results may be aggregated by the recovery program. The recovery program may then determine the proper type of recovery based on the diagnostic that failed. The recovery program may utilize all of the diagnostic results together to determine the proper type of recovery. For example, the blades may not be responding to a ping request, as reflected in the network diagnostic. However, if the power supply diagnostic determined that the power supplies were improperly configured, this may prevent the blades from powering up. As such, they would not respond to the ping request. Thus, a failure in one diagnostic may indicate the resolution may come from corrective action needed as a result of a different diagnostic.

The recovery program may contain a long list of diagnostic failures and the recovery action to take for each. For example, the recovery program may indicate that a failure in both the power supply diagnostic and the network diagnostic should be recovered by properly configuring the power supplies to match the physically present power supplies. A failure of the network diagnostic for a blade, with no corresponding power supply diagnostic failure may need to be recovered by rebooting the failing blade. As should be clear, the recovery action taken is dependent on the combination of all of the failing diagnostic tests. The recovery program is coded such that for all known combinations of errors, a recovery action that typically is successful in recovering the enclosure is taken.

In some cases, the recovery program may attempt recovery in the least disruptive manner possible or in a manner that will fix the greatest number of diagnostic test result errors. For example, a firmware diagnostic may compare the firmware version installed on each element of the enclosure to verify that the versions are all compatible. If not, there may be many failures in other diagnostic tests. The recovery action may first attempt to recover by rebooting the enclosure and all of the components therein. This is the least invasive method of recovery of firmware, as it involves no changes to the firmware. If this is recovery is unsuccessful, the recovery program may next attempt to reinstall a clean copy of the current version of the firmware. The recovery program may retrieve the clean copy from a firmware repository 280. Although this recovery is a bit more invasive, as firmware changes are being made, it is less invasive than the next step. The next recovery may be to install the latest version of the firmware. Again, the latest version may be retrieved from the firmware repository.

As was mentioned above, the recovery program gathers the diagnostic results and analyzes those diagnostics that have failures to determine the proper type of recovery. However, it is possible that the recovery program may come across a set of diagnostic results for which no recovery action has been defined. In other words, the particular combination of failure results may not have been seen before and as such no recovery action is known. A similar situation can occur when the recovery program specifies a type of recovery action, but that action does not result in the proper recovery of the enclosure.

In such cases, the recovery program may report the failed recovery to a recovery failure repository. Included in the report may be the results of the diagnostic tests. A recovery program developer may then manually analyze the diagnostic failure results to determine what the proper recovery should be. After ensuring that the determined type of recovery is successfully, the recovery program developer may deploy a new version of the recovery program to the recovery program repository. Thus, the next time that particular combination of diagnostic failure results is seen, the proper recovery is known. As such, the recovery program developer is able to receive real world feedback on the results of the recovery program, and is able to further refine the recovery program to take into account real world errors.

In addition, in some implementations, the recovery program may also report successful recoveries to the repository. These results may be analyzed to determine the most common types of errors that need to be recovered. From this analysis, further improvements to the software running in the enclosure may be developed. For example, if the network configuration diagnostic commonly fails, and the recovery action is to reset the IP addresses of the elements to a default address, this may indicate that there is a problem with the network IP addresses becoming corrupt or users changing the IP addresses. These types of issue may then be further investigated to determine if there is an error in the software or if the error is being caused by improper configuration by maintenance personnel. In the former case, the software defects can be tracked down and fixed. In the later case, additional training may be provided to maintenance personnel. In some cases, the ability for maintenance personnel to configure certain parameters may be completely disabled.

Figure 3:
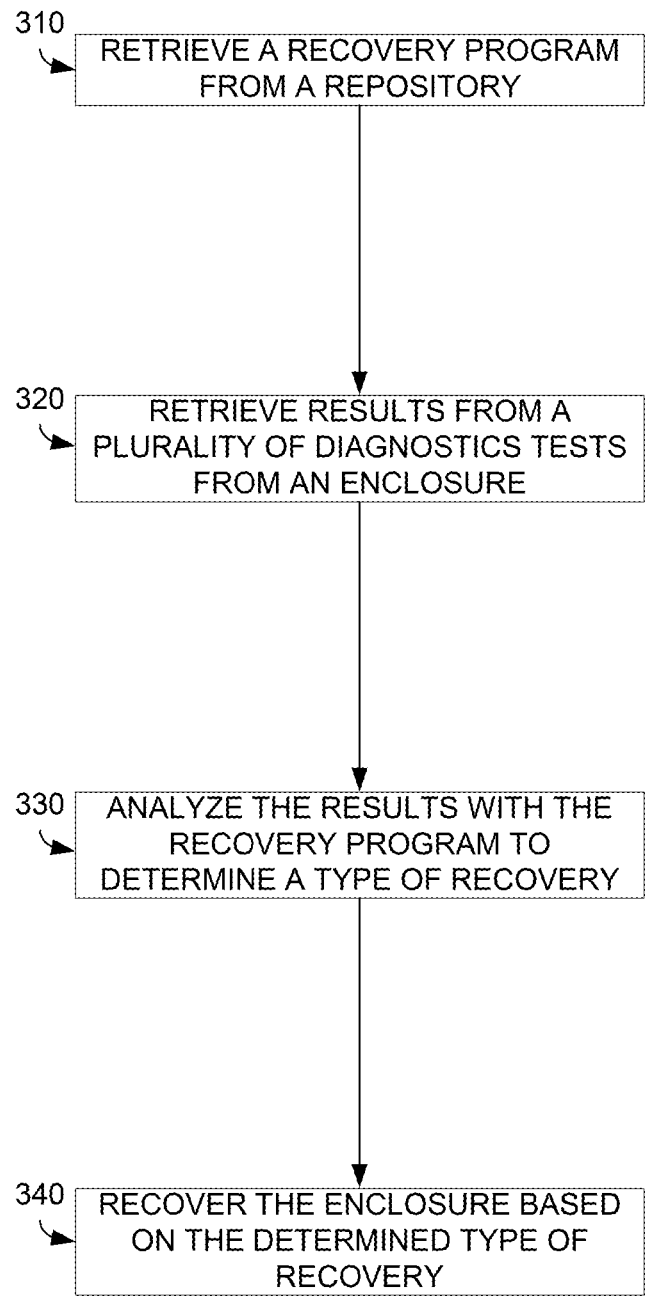
FIG. 3 is an example of a flow diagram for recovering an enclosure.

FIG. 3 is an example of a flow diagram for recovering an enclosure. In block 310, a recovery program may be retrieved form a repository. As explained above, the repository may store the latest version of the recovery program to ensure that the most recent recovery actions and diagnostics are available. In block 320, the results from a plurality of diagnostic tests may be retrieved from an enclosure. In some cases, some of the needed diagnostic results may not be available. Such a situation will be described in further detail below.

In block 330, the results may be analyzed with the recovery program to determine a type of recovery. The recovery may include rebooting the enclosure, rebooting individual components in the enclosure, resetting configuration parameters, or any other type of recovery action, for example. The particular form of the recovery may be determined by the recovery program. In block 340, the enclosure may be recovered based on the determined type of recovery. In other words, the enclosure is recovered using the type of recovery determined by analysis of the plurality of diagnostic results.

Figure 4:
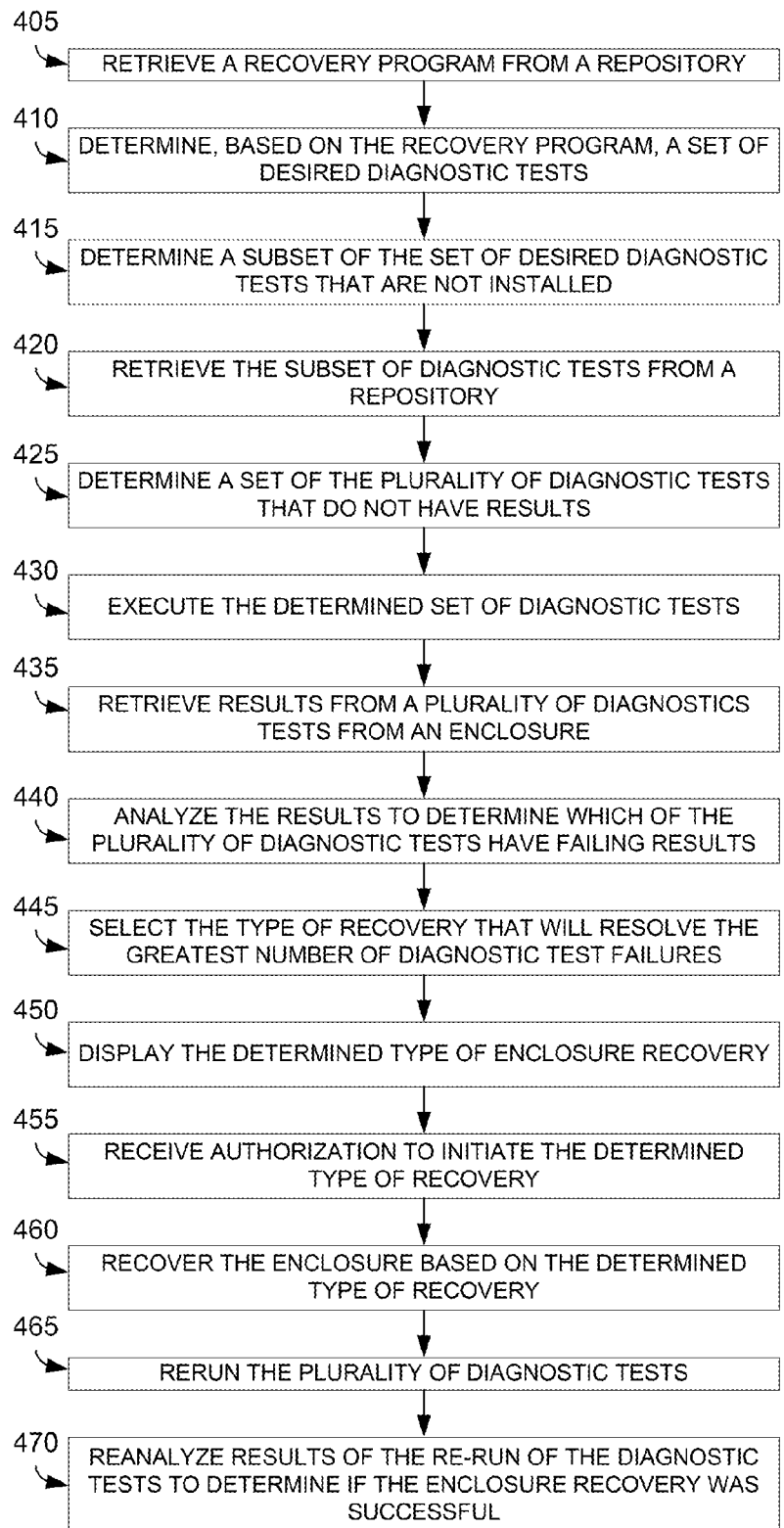
FIG. 4 is an example of a flow diagram for recovering an enclosure using retrieved diagnostic tests.

FIG. 4 is an example of a flow diagram for recovering an enclosure using retrieved diagnostic tests. In block 405, a recovery program may be retrieved from a repository. In block 410, based on the recovery program, a set of desired diagnostic tests may be determined. In other words, the recovery program is used to determine which diagnostic test results are needed. In block 415, a subset of the set of diagnostic tests that are not installed is determined. As explained above, new diagnostic tests may be created or new versions of existing diagnostic tests may be available. Block 415 determines diagnostics for which the current version is not available.

In block 420, the subset of diagnostic tests may be retrieved from a repository. The repository may store the most current version of all available diagnostic tests. Thus, after block 420, all of the diagnostic tests needed by the recovery program have already been previously installed or were retrieved from the repository. In block 425, the set of diagnostic tests that do not have results may be determined. As explained above, in some cases, the diagnostic tests that were installed may have already been run, and results for those tests are available. In such cases, it may not be necessary to rerun the diagnostic tests, as the existing results may be used. In block 430, the determined set of diagnostic tests may be executed. In other words, tests for which results are not currently available are run.

In block 435, the results from a plurality of diagnostic tests are retrieved from the enclosure. These results may have existed previously, or were created in block 430. However, after block 435, the results of all diagnostic tests needed by the recovery program are retrieved. In block 440, the results are analyzed to determine which of the plurality of diagnostic tests have failing results. As explained above, the failure of a diagnostic test itself does not determine a recovery action, but rather the analysis of all of the failures as a whole.

In block 445, the type of recovery that will resolve the greatest number of diagnostic test failures is selected. In other words, the recovery program analyzes the results of the diagnostic tests to determine which type of recovery is most likely to resolve the reasons for failure of the enclosure. In block 450, the determined type of enclosure recovery may be displayed. In block 455, authorization to initiate the determined type of recovery may be received. In this way, the operator that is performing recovery on the enclosure may be allowed to confirm that recovery should occur.

In block 460, the enclosure may be recovered based on the determined type of recovery. This may include rebooting the enclosure, rebooting individual components, changing configuration parameters, or any other type of recovery action determined by the recovery program. In block 465, the plurality of diagnostic tests may be rerun. In some implementations, only those diagnostic tests with failing results are rerun, while in other implementations, all diagnostic tests are rerun. In block 470, the results of the rerun of the diagnostic tests may be reanalyzed to determine if the enclosure recovery was successful. If the recovery was not successful, the process may repeat.

Figure 5:
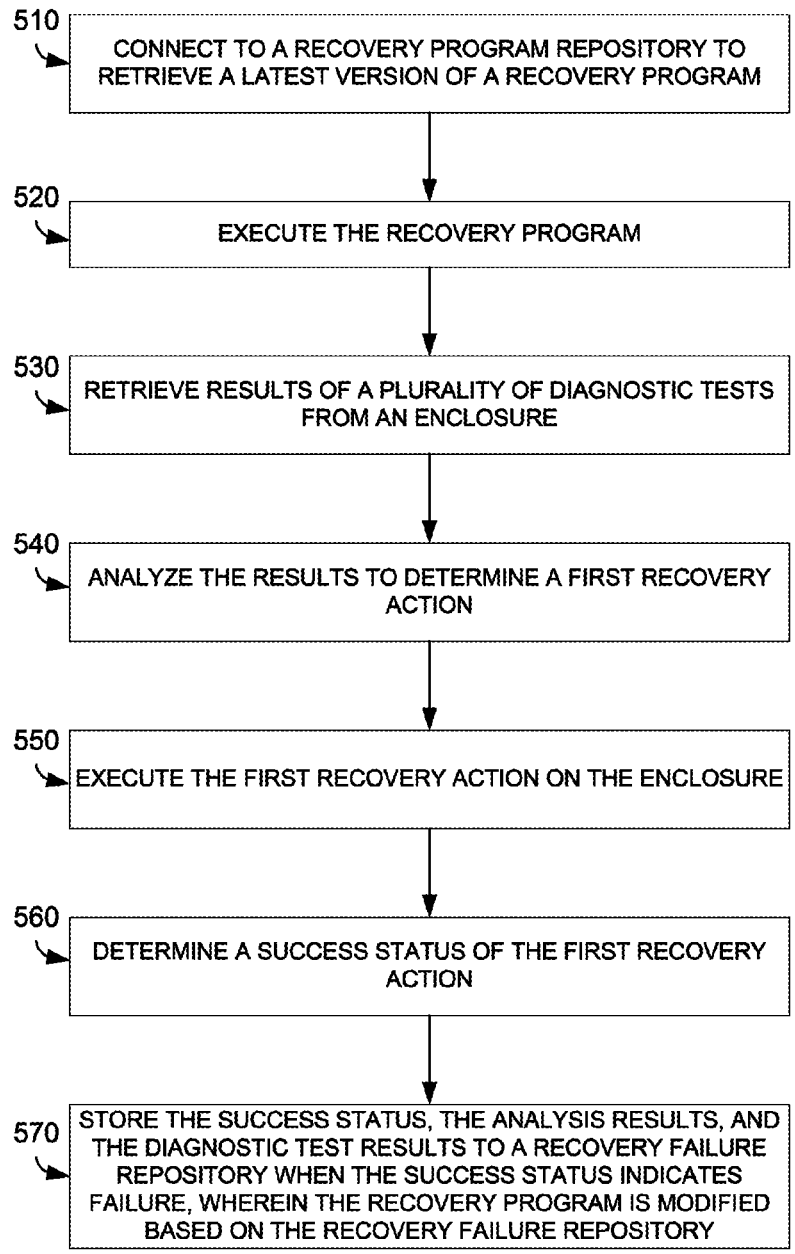
FIG. 5 is an example of a flow diagram for recovering an enclosure including storing the recovery results.

FIG. 5 is an example of a flow diagram for recovering an enclosure including storing the recovery results. In block 510, a connection to a recovery program repository is made to retrieve the latest version of a recovery program. As explained above, the latest version of the recovery program may contain all of the knowledge on how to recover an enclosure that is currently available. In block 520, the recovery program may be executed. The recovery program may specify which of a set of diagnostic test results are needed. In block 530, the results of a plurality of diagnostic tests may be retrieved form an enclosure.

In block 540, the retrieved results may be analyzed to determine a first recovery action. In other words, the recovery program may use the results to determine which type of recovery action is most likely to resolve any errors being experienced by the enclosure. In block 550, the first recovery action may be executed on the enclosure. In block 560, a success status of the first recovery action may be determined.

In block 570, the success status, the analysis results, and the diagnostic test results may be stored to a recovery failure repository when the success status indicates failure. The recovery program may be modified based on the recovery failure repository. In other words, if the recovery program is unable to recover the enclosure, the particular scenario for the failure, including the diagnostic test results is stored. A developer of the recovery program may analyze the unrecovered failure scenarios to determine what additional steps may be needed. The recovery program may then be updated, such that if this particular failure scenario were to be seen again, the recovery program would be able to recover the enclosure. This iterative feedback to the recovery program developer allows a robust recovery program that is able to handle all types of failures. As time passes, the recovery program may become fine tuned enough to be able to handle any type of enclosure failure. In addition, the process may be repeated, and a second type of recovery may be determined.

Figure 6:
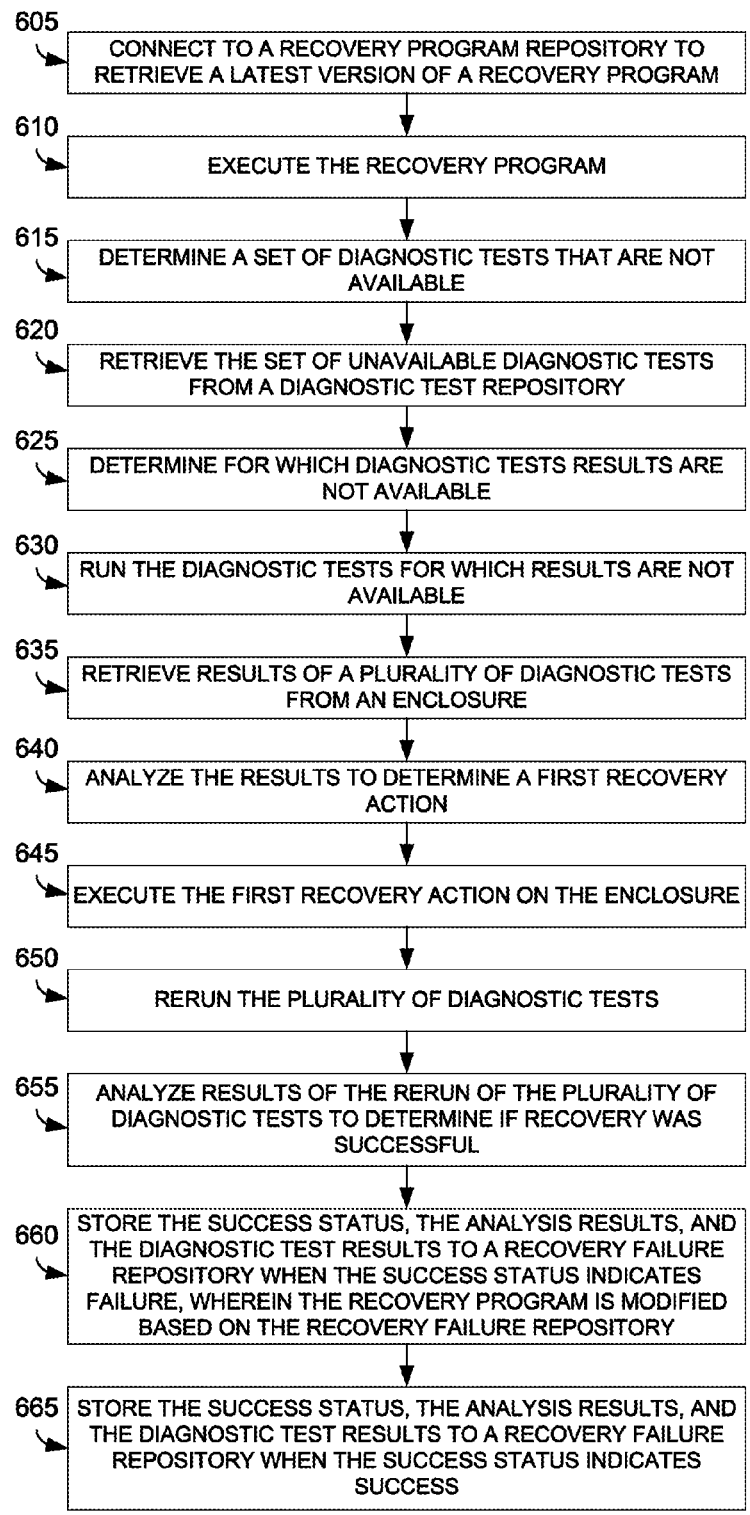
FIG. 6 is an example of a flow diagram for recovering an enclosure including retrieving diagnostic tests and storing the recovery results.

FIG. 6 is an example of a flow diagram for recovering an enclosure including retrieving diagnostic tests and storing the recovery results. In block 605 a connection to a recovery program repository may be made and a latest version of a recovery program may be retrieved. In block 610, the recovery program may be executed. In block 615, the recovery program may determine a set of diagnostic tests that are not available. An unavailable diagnostic test may be one that is not available on the enclosure or for which a later version is available. In block 620, the set of unavailable diagnostic tests may be retrieved from a diagnostic test repository. The diagnostic test repository may contain the latest version of all diagnostic tests.

In block 625, it may be determined for which diagnostic tests results are not available. The unavailability of results may be due to the diagnostic being unavailable, being superseded by a later version, or because the diagnostic test has just not been run. In block 630, diagnostic tests for which results are not available may be run. In block 635, the results of a plurality of diagnostic tests may be retrieved from the enclosure. In block 640, the results may be analyzed to determine a first recovery action. In other words, the recovery program analyzes the diagnostic test results to determine how the enclosure should be recovered.

In block 645 the first recovery action may be executed on the enclosure. As explained above, recovery may include rebooting the enclosure, rebooting components within the enclosure, changing configurations within the enclosure, or any other type of recovery action, for example. In block 650, the plurality of diagnostic tests may be rerun. In block 655, the results of the rerun of the diagnostic tests may be analyzed to determine if the recovery was successful.

In block 660, the recovery status, the analysis results, and the diagnostic test results may be stored to a recovery failure repository when the success status indicates a failed recovery. The recovery program may be modified based on these results so that if the particular error condition is seen in the future, the recovery program may know how to recover the error. In block 655, the success status, the analysis results, and the diagnostic test results may be stored in a recovery failure repository when the success status indicates success. These results may be used to determine common failure types and how successful the recovery program is at recovering those failure types.

I claim:

1. A method comprising:
   retrieving a recovery program from a repository;
   retrieving results from a plurality of diagnostics tests from an enclosure;
     analyzing the results with the recovery program to determine a type of recovery;
     recovering the enclosure based on the determined type of recovery
   determining a set of the plurality of diagnostic tests that do not have results; and
   executing the determined set of diagnostic tests.

2. The method of claim 1 further comprising:
   determining, based on the recovery program, a set of desired diagnostic tests;
   determining a subset of the set of desired diagnostic tests that are not installed; and
   retrieving the subset of diagnostic tests from a repository.

3. The method of claim 1 wherein determining the type of recovery further comprises:
   analyzing the results to determine which of the plurality of diagnostic tests have failing results; and
   selecting the type of recovery that will resolve the greatest number of diagnostic test failures.

4. The method of claim 1 further comprising:
   rerunning the plurality of diagnostic tests; and
   reanalyzing results of the rerun of the diagnostic tests to determine if the enclosure recovery was successful.

5. The method of claim 1 further comprising:
   displaying the determined type of enclosure recovery; and
   receiving authorization to initiate the determined type of recovery.

6. The method of claim 4 further comprising:
   repeating the method if the enclosure recovery was not successful.

7. A non-transitory processor readable medium containing thereon a set of processor readable instructions, which when executed by a processor cause the processor to:
   connect to a recovery program repository to retrieve a latest version of a recovery program;
   execute the recovery program, wherein the recovery program comprises instructions to:
     retrieve results of a plurality of diagnostic tests from an enclosure;
     analyze the results to determine a first recovery action;
     execute the first recovery action on the enclosure;
     determine a success status of the first recovery action;
     store the success status, the analysis results, and the diagnostic test results to a recovery failure repository when the success status indicates failure, wherein the recovery program is modified based on the recovery failure repository;
     retrieve a current version of enclosure firmware from a firmware repository; and
     reinstall the current version of the firmware.

8. The non-transitory medium of claim 7 wherein the recovery program further comprises instructions to:
   determine a set of diagnostic tests that are not available;
   retrieve the set of unavailable diagnostic tests from a diagnostic test repository;
   determine for which diagnostic tests results are not available; and
   run the diagnostic tests for which results are not available.

9. The non-transitory medium of claim 7 further comprising instructions to:
   store the success status, the analysis results, and the diagnostic test results to a recovery failure repository when the success status indicates success.

10. The non-transitory medium of claim 7 wherein the recovery program further comprises instructions to:
    rerun the plurality of diagnostic tests; and
    analyze results of the rerun of the plurality of diagnostic tests to determine if recovery was successful.

11. The non-transitory medium of claim 7 wherein the recovery action further comprises instructions to:
    retrieve a latest version of enclosure firmware from a firmware repository; and
    install the latest version of the firmware.

12. A system comprising:
    a recovery program repository to store a recovery program;
    a diagnostic test repository to store a plurality of diagnostic tests; and
    a recovery failure repository to store results of execution of the recovery program;
    wherein a recovery device retrieves the recovery program from the recovery program repository, retrieves any missing diagnostic tests from the diagnostic test repository, analyzes the results to determine which of the plurality of diagnostic tests have failing results, selects the type of recovery that will resolve the greatest number of diagnostic test failures, executes the recovery program on an enclosure, and stores the results of the recovery program to the recovery failure repository.

13. The system of claim 12 further comprising:
    a firmware repository to store enclosure firmware versions, wherein the recovery program retrieves an enclosure firmware version from the firmware repository and applies the retrieved firmware version to the enclosure.

* * * * *